United States Patent
Trautenberg

(10) Patent No.: US 8,742,984 B2
(45) Date of Patent: Jun. 3, 2014

(54) INTEGRITY METHOD FOR DIFFERENTIAL CORRECTIONS

(75) Inventor: Hans L. Trautenberg, Ottobrunn (DE)

(73) Assignee: Astrium GmbH, Taufkirchen (DE)

(*) Notice: Subject to any disclaimer, the term of this patent is extended or adjusted under 35 U.S.C. 154(b) by 273 days.

(21) Appl. No.: 13/186,993

(22) Filed: Jul. 20, 2011

(65) Prior Publication Data

US 2012/0019411 A1     Jan. 26, 2012

(30) Foreign Application Priority Data

Jul. 21, 2010  (EP) .................................. 10007560

(51) Int. Cl.
*G01S 19/41* (2010.01)

(52) U.S. Cl.
USPC .................................................... 342/357.24

(58) Field of Classification Search
USPC .................................................... 342/357.24
See application file for complete search history.

(56) References Cited

U.S. PATENT DOCUMENTS

| | | | | |
|---|---|---|---|---|
| 5,910,789 | A | * | 6/1999 | Vigen ........................ 342/357.45 |
| 2008/0288167 | A1 | * | 11/2008 | Trautenberg et al. ......... 701/214 |
| 2009/0322598 | A1 | * | 12/2009 | Fly et al. ................... 342/357.03 |

FOREIGN PATENT DOCUMENTS

EP      2 146 217 A1     1/2010

OTHER PUBLICATIONS

Mark Petovello, "GNSS Soutions: Quantifying the performance of navigation systems and standards for assisted-GNSS", Inside GNSS, Sep. 1, 2008, pp. 20-24, XP007916793.
European Office Action dated Oct. 25, 2012 (Four (4) pages).
European Search Report dated Apr. 5, 2011 (Five (5) pages).

* cited by examiner

*Primary Examiner* — Harry Liu
(74) *Attorney, Agent, or Firm* — Crowell & Moring LLP

(57) ABSTRACT

A system and method of calculating corrections to a navigation solution based on accurate data are provided. GNSS ephemeris, clock models and other navigation information are received from at least three GNSS satellites and pseudo-ranging to the GNSS satellites is performed. A PVT solution is resolved from the GNSS ephemeris, clock models, and other navigation information and the pseudo range measurements. The PVT solution includes a statistical measure. Differential GNSS data for calculating the corrections to the PVT solution is received and a corrected PVT solution is calculated based upon the differential GNSS data. The corrected PVT solution is compared to a region defined by the statistical measure and the corrected PVT solution is rejected when the corrected PVT solution is not within the region.

6 Claims, 4 Drawing Sheets

INTEGRITY METHOD FOR DIFFERENTIAL CORRECTIONS

CROSS REFERENCE TO RELATED APPLICATION

The present application claims priority to European Application No. EP 10 007 560.5, filed Jul. 21, 2010, the entire disclosure of which is herein expressly incorporated by reference.

BACKGROUND AND SUMMARY OF THE INVENTION

GPS Satellites broadcast navigation data modulated on the L1 and L2 carrier frequencies. The data contains coarse ephemeris data (referred to as almanac data) for all satellites in the constellation, precise ephemeris data for this particular satellite, and timing data and model correction parameters needed by a GPS receiver to make a correct ranging measurement. The satellites also broadcast two forms of ranging codes: the Coarse/Acquisition code (C/A), which is freely available to the public, and the restricted Precise code (P-code), which is usually reserved for military applications.

GPS receivers receive the clock data to know the precise time of the signal transmission not only in the timescale of the satellite but also in the timescale of the satellite system. Using that time, they calculate position, velocity, and time solutions (PVT) correctly. For this reason, the satellites are equipped with extremely accurate atomic clocks. Most receivers use an internal crystal oscillator-based clock that is continually updated using the signals from the satellites.

The receiver identifies each satellite's signal by its distinct spreading code pattern and then measures the time delay in generating that spreading code pattern for each satellite. To do this, the receiver produces an identical spreading sequence using the same seed number and shift register setups as the satellite. By lining up the two sequences, the receiver can determine a pseudo-range, the difference of the time of reception in the timescale of the receiver and of the time of transmission in the system or satellite timescale, or in other words the measurement of delay and calculation of the distance to the satellite.

Calculating a position with the P(Y) signal is conceptually similar in that a receiver must first decrypt the signal, then use information in the navigation data to know where in the week-long pseudorandom noise (PRN) sequence the satellite is currently broadcasting. Once this is known, tracking and measurement are the same. The encryption of P code into Y code is essentially a security mechanism; it is reasonable to assume that if a signal can be successfully decrypted, it is a real signal being sent by a GPS satellite and not a "spoofed" signal. A spoofed GPS signal is an overwritten (spoofed) signal. A spoof is defined as a malicious signal that overpowers the authentic signal and misleads the receiver to use a forged signal for further processing. In contrast, civil receivers are highly vulnerable to spoofing, since correctly formatted C/A signals can be generated using readily available signal generators.

A GPS receiver, however, can never measure exact range to each satellite because the measurement process is corrupted by noise which introduces errors into the calculation. This noise includes errors in the ionospheric corrections and system dynamics not considered during the measurement process (e.g., user clock drift). A Kalman filter characterizes the noise sources in order to minimize their effect on the desired receiver outputs.

When the GPS receiver is aided or integrated with other navigation sensors (e.g., inertial navigation sensors ("INS"), clock, or altimeter), then the Kalman filter can be extended to include the measurements added by these sensors. For more accurate position measurements, a user receiver receives deviation information from a reference receiver and to provide differential correction to the user receiver. A system using a user receiver with one or more reference receivers is referred to as Differential GPS (DGPS). Examples of differential reference systems are RTCM, StarFire, WAAS, LAAS, EGNOS, and MSAT.

The idea of differential positioning is to correct range bias errors at the mobile receiver location with the observed range bias errors at a known position. The reference station computes corrections for each satellite signal. DGPS implementations require software in the reference receiver that can track all "visible" satellites and form pseudo-range corrections. These corrections are transmitted to the user receiver, which applies these corrections to the pseudo-range measurement for each satellite used in the navigation solution. In this case, the reference receiver has limited effect at useful ranges because both receivers would have to be using the same set of satellites to resolve their navigation solutions.

Current DGPS systems may be "spoofed" with erroneous data from the reference receiver that will confuse the DGPS receiver. When the DGPS receiver receives erroneous data, that data can cause the DGPS receiver to report position or velocity vectors that contain hazardously misleading errors with respect to the true values of the vectors. In short, the DGPS may produce a value for either or both vectors that is less accurate than those reported by the non-differential GPS.

European Patent document EP 2 146 217 A1 describes a method and apparatus for calculating corrections to a navigation solution based on differential GPS data which includes receiving GPS ephemeris from at least three GPS satellites. A position, velocity, and time (PVT) solution is resolved from the GPS ephemeris. The PVT solution includes a Circular Error Probable (CEP). Differential GPS data for calculating the corrections to the PVT solution is received. A corrected PVT solution is then based upon the differential GPS data. The corrected PVT solution is compared to a region defined by the CEP. Where the corrected PVT solution is not within the region, the corrected PVT solution is rejected in favor of the PVT solution for determining an accurate navigational solution.

A disadvantage of EP2 146 217 A1 is that by using the CEP 50% of all measurements are outside of the CEP, therefore the availability of the system is very low. With the HUL of Brenner availability could be increased to 99.9%, but the HUL is not mentioned in the claims. Furthermore the HUL is very bad in absorbing biases. Another disadvantage of the proposed solution in EP 2 146 217 A1 is the non-conservative estimation of the probability of the corrected PVT solution being further than the alert limit away from the real position.

Exemplary embodiments of the present invention involve a method with a higher availability than the methods described in the prior art and which provides a conservative estimation of the risk that the corrected position solution is further than the alert limit away from the real position.

One embodiment of the invention describes a method of calculating corrections to a navigation solution based on accurate data which comprises the steps of receiving GNSS ephemeris, clock models and other navigation information from at least three GNSS satellites; performing pseudo-ranging to the GNSS satellites; resolving a PVT solution from the GNSS ephemeris, clock models and other navigation information, and the pseudo range measurement, wherein the PVT solution includes a statistical measure; receiving differential GNSS data for calculating the corrections to the PVT solution calculating a corrected PVT solution based upon the differential GNSS data; comparing the corrected PVT solution to an region defined by the statistical measure; and rejecting the corrected PVT solution where the corrected PVT solution is not within the region.

One technical effect is that this method provides a higher availability than the methods described in the prior art. A further advantage is the method provides a conservative estimation of the risk that the corrected position solution is further than the alert limit away from the real position.

According to another embodiment of the invention the statistical measure is based on protection levels.

According to a further embodiment of the invention the statistical measure is based on integrity risk.

According to another embodiment of the invention the rejecting of the corrected PVT solution includes activating an alert.

According to a further embodiment of the invention the activating of an alert includes modifying an icon in a display.

According to another embodiment of the invention the activating of an alert includes generation of a display including words and figures indicative of rejection of the differential GPS data.

According to a further embodiment of the invention the activation of an alert includes an aural alert.

Another embodiment of the invention describes an apparatus and a system for calculating corrections to a navigation solution based on accurate data, comprising: means for receiving GNSS ephemeris, clock models and other navigation information from at least three GNSS satellites; means for performing pseudo-ranging to the GNSS satellites; means for resolving a PVT solution from the GNSS ephemeris, clock models and other navigation information and the pseudo range measurements, wherein the PVT solution includes a statistical measure; means for receiving differential GNSS data for calculating the corrections to the PVT solution calculating a corrected PVT solution based upon the differential GNSS data; means for comparing the corrected PVT solution to an region defined by the statistical measure; and means for rejecting the corrected PVT solution where the corrected PVT solution is not within the region.

Other objects, advantages and novel features of the present invention will become apparent from the following detailed description of one or more preferred embodiments when considered in conjunction with the accompanying drawing.

DETAILED DESCRIPTION OF THE DRAWING

According to one embodiment of the invention, the Differential Global Navigation Satellite System (DGNSS) solution is not selected as PVT, if the DGNSS solution differs from the PVT solution by more than the Protection Levels of the PVT in case of SBAS or RAIM.

In another embodiment of the invention, the DGNSS is not selected as the PVT, if the protection level of the PVT increased by the horizontal/vertical/3d distance between the DGNSS PVT and the PVT is larger than the horizontal/vertical/3d alert limit.

In still another embodiment of the invention, the DGNSS is not selected as the PVT, if the integrity risk of the DGNSS PVT at the (horizontal/vertical/3d alert limit reduced by the horizontal/vertical/3d distance between the PVT and DGNSS PVT) is larger than the tolerable integrity risk.

The invention is applicable not only for the horizontal case, but also for the vertical case and the 3-dimensional case.

In the prior art the technology Receiver Autonomous Integrity Monitoring (RAIM) is known. This is a technology developed to assess the integrity of GPS signals in a GPS receiver system. It is of special importance in safety critical GPS applications, such as in aviation or marine navigation.

RAIM detects faults with redundant GPS pseudo-range measurements. That is, when more satellites are available than needed to produce a position fix, the extra pseudo-ranges should all be consistent with the computed position. A pseudo-range that differs significantly from the expected value (i.e., an outlier) may indicate a fault of the associated satellite or another signal integrity problem (e.g., ionospheric dispersion).

RAIM operates autonomously, that is without the assistance of external signals, it requires redundant pseudo-range measurements. To obtain a 3D position solution, at least 4 measurements are required. To detect a fault, at least 5 measurements are required, and to isolate and exclude a fault, at least 6 measurements are required, however often more measurements are needed depending on the satellite geometry. Typically there are 7 to 12 satellites in view.

A Satellite Based Augmentation System (SBAS) is a system that supports wide-region or regional augmentation through the use of additional satellite-broadcast messages. Such systems are commonly composed of multiple ground stations, located at accurately-surveyed points. The ground stations take measurements of one or more of the GPS satellites, the satellite signals, or other environmental factors which may impact the signal received by the users. Using these measurements, information messages are created and sent to one or more satellites for broadcast to the end users.

The method of the invention may be based upon the reception of P-code but in another embodiment may be based upon reception of the relatively simple C/A code or any other combination of ranging signals from GNSS.

Figure 1A:
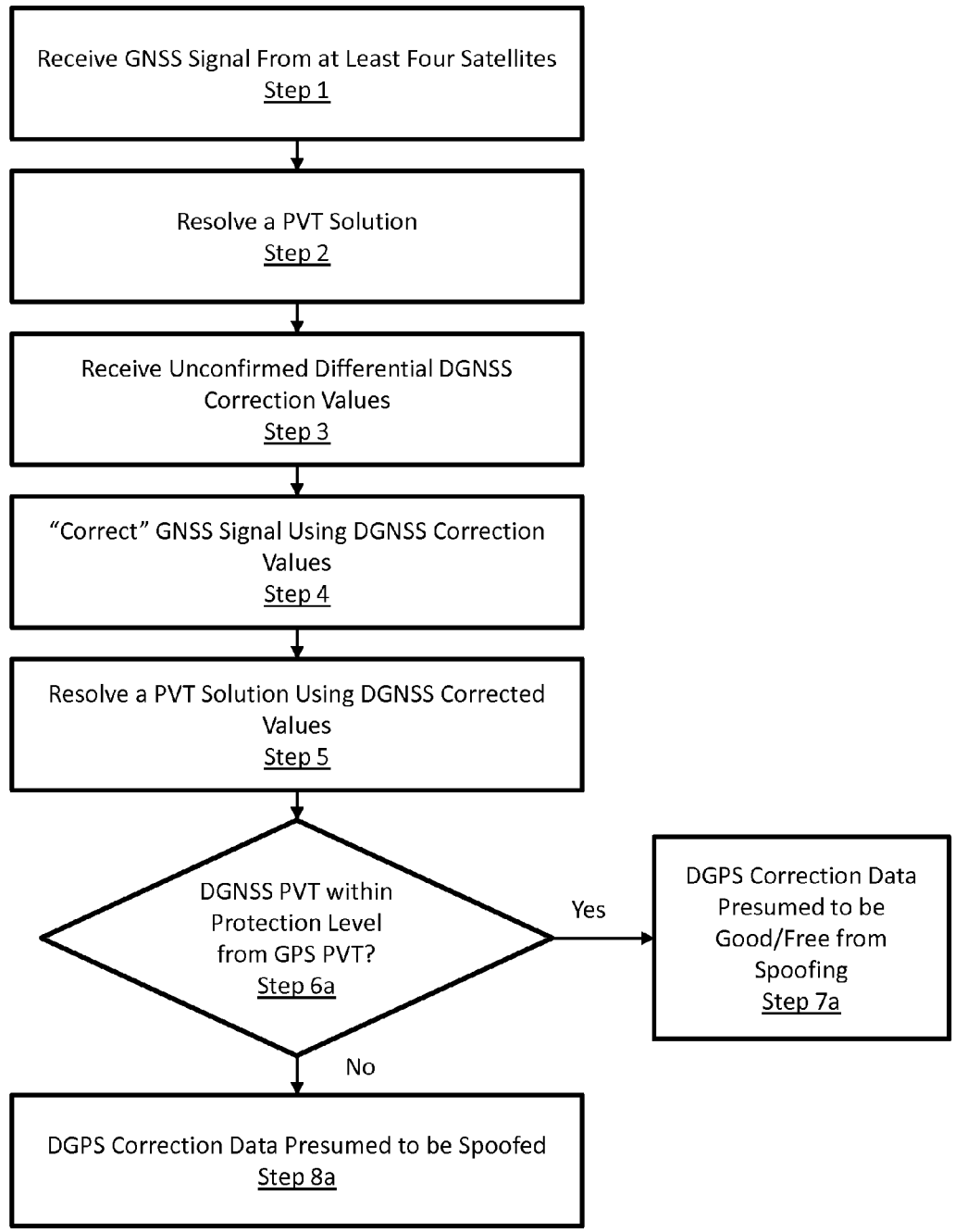
FIGS. 1A-1C depict flow charts indicating an exemplary method of the present invention of selectively resolving a GPS signal based upon suspect differential corrections.

The method will now be described in connection with FIGS. 1A-1C.

Step 1: Receive GNSS Signal from at least Four Satellites

In either instance, at least four GNSS signals received in a step 1.

Step 2: Resolve a PVT Solution

The GNSS signals received in step 1 are resolved to determine a position, velocity, and time (PVT) solution. In addition to the PVT the protection according to RAIM or SBAS will be computed. More than 4 GNSS signal might be required.

The PL is either Horizontal PL (HPL) or Vertical PL (VPL). The HPL, VPL are statistical measures of the trust one can place in the position solution.

The HPL is defined as the radius of a circle in the horizontal plane (the plane tangent to the WGS-84 ellipsoid), with its center being at the true position (PVT solution), which describes the region that is assured to contain the indicated horizontal position. It is based upon the error estimates provided by SBAS or RAIM.

The VPL is defined as half the length of a segment on the vertical axis (perpendicular to the horizontal plane of WGS- 84 ellipsoid), with its center being at the true position (PVT solution), which describes the region that is assured to contain the indicated vertical position. It is based upon the error estimates provided by SBAS or RAIM.

The PL guarantees to contain the true position of the receiver to within the specifications of the RAIM or the SBAS scheme (i.e. which meets the Pfa and Pmd). The PL is calculated as a function of the RAIM threshold or the SBAS threshold and the satellite geometry at the time of the measurements.

The invention is applicable for all PL and also for integrity schemes like Galileo, where the statistical measure is the integrity risk at the alert limit(s).

A Kalman filter might be used to compute the position from the received signals. In one embodiment, GNSS and Inertial Navigation Systems (INS) are used for position and velocity determination applications. When combined together, GNSS and INS provide many complimentary characteristics that overcome the limitations experienced when using each sensor individually. GNSS and INS sensors are typically combined using a Kalman filter. There are principally two ways GNSS and INS data can be combined. They are commonly known as loosely and tightly coupled systems.

In a loosely coupled system, two processes must be performed sequentially. Firstly, the GNSS data must be processed in its own Kalman filter. The output position and velocity information can then be used in a separate filter when processing the inertial data, and is used to bind the INS measurement error growth. The major advantage to a loosely coupled system is its design simplicity relative to a tightly coupled system.

A tightly coupled system integrates both GNSS and INS measurements into a single Kalman filter. This has several theoretic advantages over a loosely coupled system. Firstly, any number of GPS measurements may be used in the filter, therefore even if just one satellite is being tracked, that data can be used within the filter to help bind INS error growth. Additionally, it is possible that cycle slips may be fixed in GNSSS data. The disadvantage to such a system is the complexity of the design and the ability to make such a system functional in practice.

The Kalman filter requires a dynamic model to describe the way in which the errors develop over time and the selection of a best PVT solution inherently weights the system to reject bad correction data. The Kalman filter is a linear, recursive estimator that produces the minimum variance estimate in a least squares sense under the assumption of white, Gaussian noise processes. Because the filter is a linear estimator by definition, for navigation systems it generally estimates errors in the total navigation state. The Kalman filter also produces a measure of the accuracy of its error state vector estimate. This level of accuracy is the matrix of second central moments of the errors in the estimate and is defined as the covariance matrix.

There are two basic processes that are modeled by a Kalman filter. The first process is a model describing how the error state vector changes in time. This model is the system dynamics model. The second model defines the relationship between the error state vector and any measurements processed by the filter and is the measurement model.

Intuitively, the Kalman filter sorts out information and weights the relative contributions of the measurements and of the dynamic behavior of the state vector. The measurements and state vector are weighted by their respective covariance matrices. If the measurements are inaccurate (large variances) when compared to the state vector estimate, then the filter will deweight the measurements. On the other hand, if the measurements are very accurate (small variances) when compared to the state estimate, then the filter will tend to weight the measurements heavily with the consequence that its previously computed state estimate will contribute little to the latest state estimate.

Thus in this step, by either of the GNSS alone or GNSSS/INS systems, a PVT solution is derived.

Step 3: Receive Unconfirmed Differential DGNSS Correction Values

In accord with any of a non-limiting set of differential GNSS systems such as StarFire, RTCM, WAAS, LAAS, EGNOS, or MSAT, correction data is received that correlates with each of the satellites used to develop the GNSS PVT solution in this step.

Step 4: "Correct" GNSS Signal Using DGNSS Correction Values

In this step, the satellite signals are corrected in accord with the received correction data.

Step 5: Resolve PVT Solution Using DGNSS Corrected Values Producing DGNSS PVT

In this step, the corrected data are used in a similar manner as the uncorrected data are used in Step 2 to develop a DGNSS PVT solution.

Step 6a: Decision, if DGNSS PVT within Protection Level from GPS PVT

In this step, the DGPS PVT solution is compared to the region around the GPS PVT solution enclosed by the Protection Level.

If the DGPS PVT solution is within the region defined by the Protection Level, the DGPS correction data is presumed to be good or free from "spoofing" or other unwanted effects and a new position for the user receiver is based upon the DGPS PVT (step 7a). The DGPS PVT solution might then be fed into the Kalman filter as the current position for developing the next iteration. The method then repeats.

If the DGPS PVT solution is outside of the region defined by the Protection Level, the DGPS correction data is presumed to be either intentionally or unintentionally "spoofed" (step 8a). Because of the detected "spoofing", an indicator that the DGPS data has been spoofed is activated.

Figure 1B:
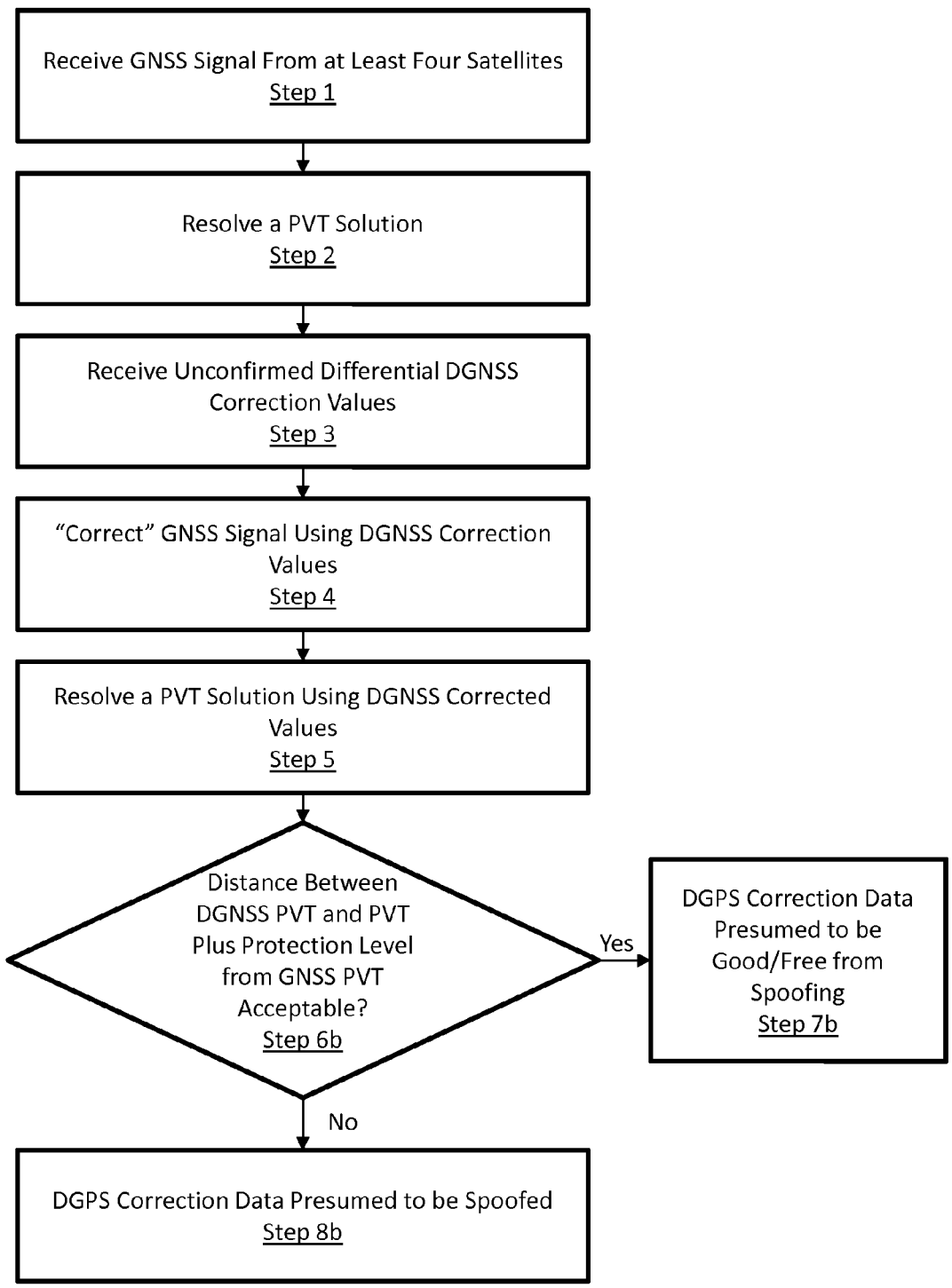

An alternative to the decision of step 6a is illustrated in FIG. 1B.

Step 6b: Decision, if distance between DGNSS PVT and PVT plus protection level from GNSS PVT is acceptable.

In this step, the DGPS PVT solution is rejected if distance between DGNSS PVT and PVT plus protection level from GNSS PVT is larger than the alert limit (step 8b).

If the DGPS PVT solution is not rejected the DGNSS PVT solution is then fed into the Kalman filter as the current position for developing the next iteration (step 7b). The method then repeats.

If the DGNSS PVT solution is rejected, the DGPS correction data is presumed to be either intentionally or unintentionally "spoofed". Because of the detected "spoofing", an indicator that the DGPS data has been spoofed is activated.

Figure 1C:
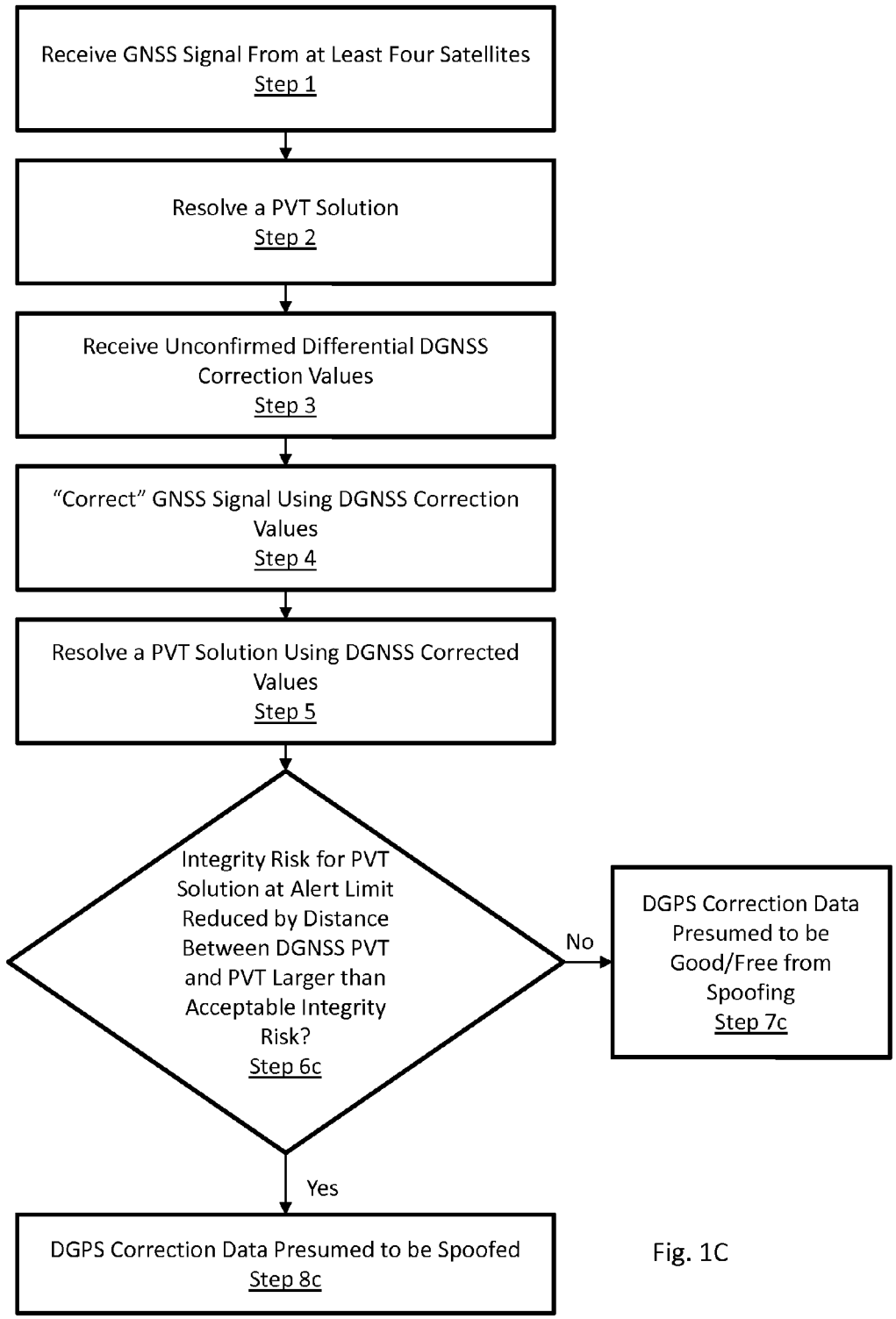

An alternative to the decision of step 6a or 6b is illustrated in FIG. 1C.

Step 6c: Decision base on integrity risk

In this step, the DGPS PVT solution is rejected if the integrity risk for the PVT solution at the alert limit reduced by the distance between DGNSS PVT and PVT is larger than the acceptable integrity risk.

If the DGPS PVT solution is not rejected the DGNSS PVT solution might then be fed into the Kalman filter as the current position for developing the next iteration (step 7c). The method then repeats.

If the DGNSS PVT solution is rejected, the DGPS correction data is presumed to be either intentionally or unintentionally "spoofed" (step 8c). Because of the detected "spoofing", an indicator that the DGPS data has been spoofed is activated.

For some embodiments, the indicator may be as simple as a lamp or some sort of enunciator, or it may be a flag on the data that is provided downstream to a flight management system. In one embodiment, the color of a position icon on a map may shift from one color indicating greater confidence to a second color indicating lesser confidence in the position the icon portrays.

Because the DGPS correction data is presumed "spoofed", the DGPS PVT solution is rejected in favor of the GPS PVT solution. The GPS PVT solution is then fed into the Kalman filter as the current position for developing the next iteration. The method then repeats.

Figure 2:
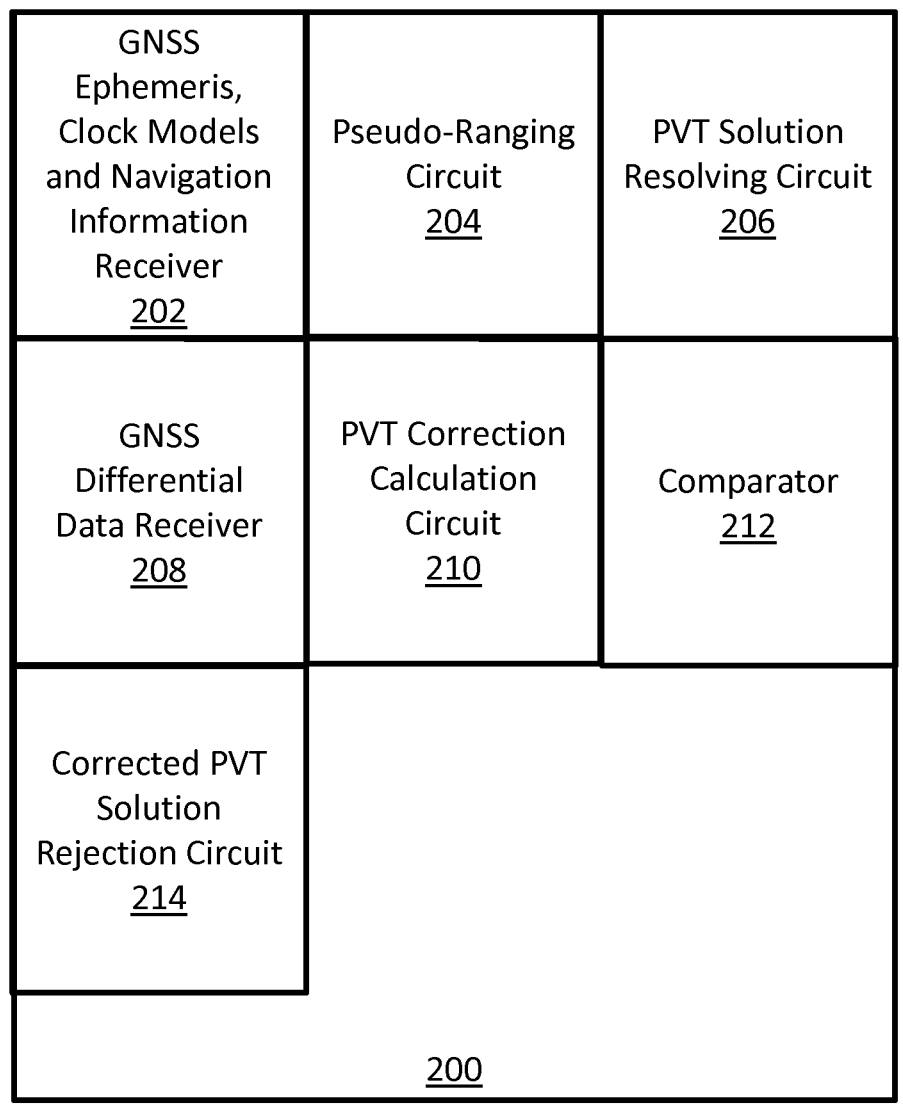
FIG. 2 depicts an exemplary apparatus in accordance with the present invention.

Exemplary embodiments of the present invention are also directed to an apparatus and a system for calculating corrections to a navigation solution based on accurate data, such as that illustrated in FIG. 2. The apparatus or system 200 includes means for receiving GNSS ephemeris, clock models and other navigation information from at least three GNSS satellites (receiver 202); means for performing pseudo-ranging to the GNSS satellites (circuit 204); means for resolving a PVT solution from the GNSS ephemeris, clock models and other navigation information and the pseudo range measurements, wherein the PVT solution includes a statistical measure (circuit 206); means for receiving differential GNSS data for calculating the corrections to the PVT solution (receiver 208); means for calculating a corrected PVT solution based upon the differential GNSS data (circuit 210); means for comparing the corrected PVT solution to an region defined by the statistical measure (comparator 212); and means for rejecting the corrected PVT solution where the corrected PVT solution is not within the region (circuit 214).

It should be recognized that the receivers and circuits in FIG. 2 are illustrated separately for ease of explanation. These receivers and/or circuits can be combined as desired. Additionally, the circuits can be hard-wired circuits or can be computer-readable code stored in a non-transitory storage medium, the code being executed by a processor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of calculating corrections to a navigation solution based on accurate data, comprising:
   receiving global navigation satellite system (GNSS) ephemeris, clock models and other navigation information from three GNSS satellites;
   performing pseudo-ranging to the three GNSS satellites;
   resolving a position, velocity and time (PVT) solution from the GNSS ephemeris, clock models and other navigation information, and the pseudo range measurements, wherein the PVT solution includes a statistical measure, wherein the statistical measure is based on protection levels or integrity risk;
   receiving differential GNSS data for calculating corrections to the PVT solution and calculating a corrected PVT solution based upon the differential GNSS data;
   comparing the corrected PVT solution to a region defined by the statistical measure,
      wherein the region is defined by the protection levels and the comparing comprises comparing of the corrected PVT solution to the region around the PVT solution enclosed by a protection level, or
      wherein the region is defined by an acceptable integrity risk and the comparing comprises comparing the integrity risk for the PVT solution at an alert limit reduced by the distance between the corrected PVT solution and the PVT solutions with acceptable integrity risk; and
   rejecting the corrected PVT solution when the corrected PVT solution is not within the region.

2. The method of claim 1, wherein the rejecting of the corrected PVT solution includes activating an alert.

3. The method of claim 2, wherein the activating of an alert includes modifying an icon in a display.

4. The method of claim 2, wherein the activating of an alert includes generation of a display including words and figures indicative of rejection of the differential GPS data.

5. The method of claim 2, wherein the activation of an alert includes an aural alert.

6. An apparatus for calculating corrections to a navigation solution based on accurate data, comprising:
   means for receiving global navigation satellite system (GNSS) ephemeris, clock models and other navigation information from three GNSS satellites;
   means for performing pseudo-ranging to the three GNSS satellites;
   means for resolving a position, velocity and time (PVT) solution from the GNSS ephemeris, clock models and other navigation information, and the pseudo range measurements, wherein the PVT solution includes a statistical measure, wherein the statistical measures is based on protection level or integrity risk;
   means for receiving differential GNSS data for calculating the corrections to the PVT solution and for calculating a corrected PVT solution based upon the differential GNSS data;
   means for comparing the corrected PVT solution to a region defined by the statistical measure,
      wherein the region is defined by the protection levels and the comparing comprises comparing of the corrected PVT solution to the region around the PVT solution enclosed by a protection level, or
      wherein the region is defined by an acceptable integrity risk and the comparing comprises comparing the integrity risk for the PVT solution at an alert limit reduced by the distance between the corrected PVT solution and the PVT solution with the acceptable integrity risk; and
   means for rejecting the corrected PVT solution when the corrected PVT solution is not within the region.

* * * * *